April 8, 1952 G. H. ERB ET AL 2,592,130
INSULATING FASTENING DEVICE
Filed Oct. 24, 1946

INVENTORS
George H. Erb
James V. Dwyer
Andrew G. Kolessar
BY
ATTORNEY

UNITED STATES PATENT OFFICE 2,592,130

INSULATING FASTENING DEVICE

George H. Erb, South Orange, James J. Dwyer, Union, and Andrew G. Kolessar, Linden, N. J., assignors to Elastic Stop Nut Corporation of America, Union, N. J., a corporation of Delaware Application October 24, 1946, Serial No. 705,342

6 Claims. (Cl. 174—163)

The present invention relates to fastening devices and has particular reference to fastening devices for securing different parts together by means of a screw threaded element.

The general object of the invention is the provision of a novel form of such device applicable to a wide variety of specific uses, which among other advantages enables a device of standard kind and size to be applied with equal facility and effectiveness to parts having substantial dimensional variations due to manufacturing tolerances and the like, to be utilized without change with screw threaded elements having different thread standards, to provide electrical insulation or conduction as desired and to be relatively very cheap both as to cost of manufacture and of assembly when used.

Other and more detailed objects, together with the more detailed nature of the invention and the manner in which the several objects thereof are accomplished, appear more fully in the ensuing portion of this specification in which, by way of example but without limitation, a preferred form of the invention is disclosed.

Figure 1:
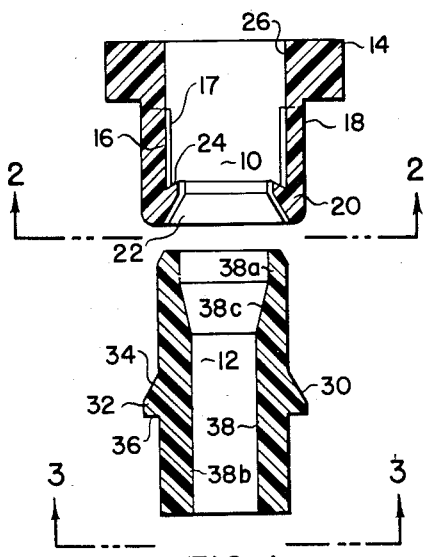
Figure 2:
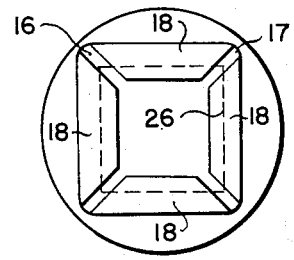
Figure 3:
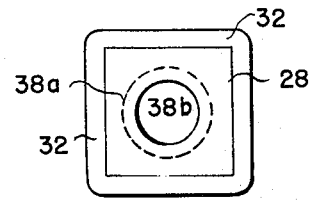
Figure 4:
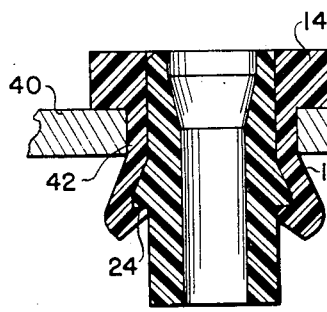
Figure 5:
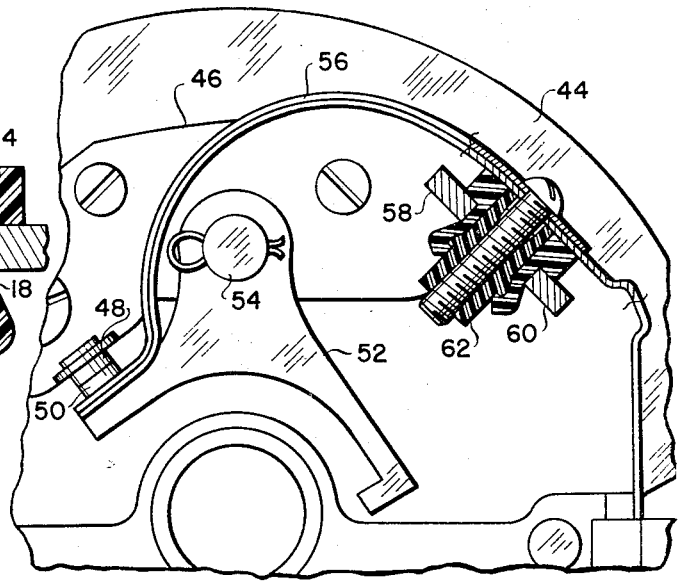

In the accompanying drawings forming a part hereof:

Fig. 1 is an exploded longitudinally central sectional view of the parts comprising the device;

Figs. 2 and 3 are end views of the parts seen from the lines 2—2 and 3—3 respectively;

Fig. 4 is a central longitudinal section of the device with the parts in assembled relation; and Fig. 5 is a fragmentary plan view showing a representative application of the device.

Referring now to the drawings the device comprises an outer hollow member indicated generally at 10, and a cooperating inner member 12. Member 10 comprises a head portion 14 and a shank portion 16 depending from the head portion. The shank portion is longitudinally slotted by means of slots 17 to provide a plurality of separate fingers 18. Each of the fingers 18 has projecting inwardly therefrom a latching abutment 20 provided with a lower inclined wedging surface 22 and an upper latching surface 24.

In the example illustrated, the outer perimeter of the head portion is circular while the outer perimeter of the shank portion is square, the latter portion being slotted at its corners to provide two pairs of confronting fingers. Also, in the example shown, the inner surface 26 of the hollow member is square in cross section. The reasons for this specific form of construction and the variations therein contemplated within the scope of the invention will be discussed hereinafter.

The inner member 12 has a square external surface 28 complementary to the surface 26 of the outer member and is provided with an outwardly projecting flange 30 providing a series of wedging abutments 32 projecting from the several sides of the member and having inclined upper wedging surfaces 34 and lower latching surfaces 36. In the example shown, the member 12 is hollow, being provided with a differential bore 38 having an enlarged bore portion 38a at one end joined to the main bore portion 38b by the tapered shoulder portion 38c.

The outer member 10 is made from elastic material having sufficient elasticity to enable the fingers 18 to be spread outwardly to a substantial degree without fracture or loss of their elastic properties. Advantageously the outer member is made of a thermoplastic material of which the preferred material is nylon, since such material is readily molded, has the required strength and elasticity, and possesses relatively high dielectric strength. The inner member is likewise preferably made from nylon, since such material is elastically thread impressionable and provides for a highly advantageous function of the device in one of its most important uses, as will hereafter be more fully explained.

Insofar as the present invention is concerned, however, other materials having the required properties may be employed.

Referring now to Fig. 4 the device is shown with the parts in assembled relation attached to a body 40 in the form of a plate having a square aperture 42 therethrough.

The manner in which the device is installed is largely obvious from the drawing, the shank portion 16 of the member 10 being inserted through the aperture until the head portion 14 comes into contact with one surface of the plate. Thereafter while the head portion is held in engagement with the plate by any suitable means the inner member is forced into the outer member from the shank end of the latter. As the parts initially engage, the entering end of the inner member engages the inclined surfaces 22 on the fingers 18 and spreads the latter. As the inner member is forced further into the outer member the inclined surfaces 34 of the wedging abutments on the inner member engage surfaces 22 and force the fingers still further outwardly until the wedging abutments 32 pass the latching abutments 20 on the outer member. When this position has been reached, the fingers 18, due to the elasticity of the material of the outer member, snap over the abutments 32 on the inner member to latch the two parts together so as to prevent withdrawal of the inner member from the outer member. As will be obvious from the drawing, the latching surfaces 24 on the abutments 20 of the outer member are advantageously slightly inclined so that after the fingers are moved to their spread positions when the parts are assembled, these surfaces will lie in a plane normal to the axis of the device in firm engagement with the latching surfaces 36 on the abutments 32 of the inner member, which are also preferably normal to the axis of the device. Were it not for this inclined position of the surfaces 24 the resulting inclined position of these surfaces in their assembled position would result, upon application of axial pressure to the inner member in a direction tending to force it back out of the outer member, in a wedging action tending to spread the fingers and release the parts. In most instances it is desirable that the two members be firmly locked together once they are assembled, but within the contemplation of the invention the latching surfaces may be positioned so that after assembling of the parts there is a slight inclination of these surfaces which would permit disassembly of the parts upon application of axial pressure greater than that which would be encountered in the normal service of the device.

As will readily be observed from Fig. 4, the place at which the fingers 18 begin to spread is determined by the thickness of the apertured body 40, and since these fingers are elastic so that they can bend at any place along their length within reasonable limitations, it will be apparent that the device will accommodate itself to variations in the thickness of the body 40 and still provide a firm connection between the parts.

As shown in Fig. 4 the body 40 is indicated as a single plate, but it will further be quite apparent that this body may comprise a plurality of plates which it may be desired to clamp together by the spreading action of the fingers 18.

While the device is capable of use analogous to that of a rivet for holding different parts together in clamped relation, it finds its greatest utility as what is in effect a nut secured to one body, to which another body is to be attached by means of a threaded connecting element such as a screw or bolt. An application of the latter use is illustrated in Fig. 5 showing part of a timer for an electrical ignition system. Except for the device embodying the present invention the structure shown in this figure is of a conventional nature comprising a base plate 44 carrying a mounting plate 46 to which is attached one contact 48 of a pair, the other of which 50 is carried by the cam follower 52 mounted to oscillate about the pin 54 and biased to keep the contacts in engagement by the usual metal spring 56. A metal support 58 having a square aperture 60 is struck up from the plate 46. The outer member 10 of the fastening device is inserted through this aperture, and the outer and inner parts of the device are assembled as previously described in connection with Fig. 4. The spring 56 is then secured to the support 58 by means of a machine screw 62 threaded through the bore 38 of the inner member of the device. This mode of attachment is readily accomplished because of the thread impressionable nature of the material of the inner member, and due to the elastic gripping action of the material the screw is firmly held against vibration forces tending to make the screw back out. Also, because of the thread impressionable nature of the material and the provision of the unthreaded bore 38, the same fastening device is equally available regardless of differences in thread type or standard of the element 62.

In a timer mechanism of the kind shown, the current carrying spring 56 must be electrically insulated from the parts electrically connected to the contact 48, and with the device of the present invention the desired electrical insulation, as well as the desired attachment of the parts, is accomplished by virtue of the nature of the material from which the device is made.

When the device is intended for use as a form of nut for receiving a screw threaded element, it is obvious the installation must be such that the parts of the device cannot turn relative to each other and that the outer member cannot turn in the body to which the device is secured. To this end, the outer surface of the shank portion of the outer member is made non-circular in cross section and advantageously of polygonal form. The square form illustrated is preferred, but it will be evident that the criterion is a non-circular cross section which will prevent rotation in a similarly shaped aperture. Likewise, the outer surface of the inner member and the inner surface of the outer member are made of non-circular section to prevent relative rotation. In this case also, the square configuration is to be preferred but is not required so long as a non-circular configuration is used. A polygonal configuration for both the inner and outer surfaces of the outer member is preferable since it provides the most advantageous form of fingers with uniform wall thickness and further provides for a very substantial resistance to turning, which should be insured because of the appreciable torque applied to the device when a screw threaded element is driven into the device to impress its thread therein.

While from the standpoint of a standardized production item adapted for use with any length of bolt or screw, it is advantageous to have the bore 38 extend entirely through the inner member, it will be evident that if desired this bore can stop short of the end of the member to provide a screw receiving bore in the form of a recess closed at its bottom. As hereinbefore noted, the device may have uses analogous to that of a rivet and in such cases the cross sectional configuration of the parts is of less importance, and the inner member may, if desired, be made with the bore omitted. In the latter case, the material of which the inner member is made need not necessarily be thread impressionable or even elastic.

While in Fig. 5 an application has been shown which requires the device to be of an insulating nature, which quality is obtained by the use of the preferable plastic material, the advantages of the highly elastic qualities of plastic materials such as nylon or other thermoplastics, required for the fingers of the outer member and the thread gripping properties of the inner member, may also readily be made use of in devices which in use require the property of being electrically conductive. This may be accomplished by incorporating in the plastic material from which the parts are molded a filler of powder having electrically conductive properties such for example as graphite or very finely powdered metal.

From the foregoing it will be apparent that within the contemplation of the invention both the specific design and material employed may vary considerably from the example herein disclosed by way of illustration, and it is therefore to be understood that the invention is to be considered as embracing all devices falling within the scope of the appended claims.

What is claimed:

1. A fastening device comprising two members of elastic electrical insulating material, said members consisting of an outer hollow member shaped to be inserted through an opening in an apertured plate and an inner member shaped to be inserted in said outer member and spread a portion of the latter on one side of the plate to secure it in place, said inner member having a bore therein for the reception and threaded engagement with a threaded element to be held by said device in fixed and insulated relation to said plate.

2. A device as set forth in claim 1 in which said outer hollow member is provided with an enlarged head portion for engaging the surface of the apertured plate adjacent the aperture therein and a shank portion extending from said head portion, said shank portion being longitudinally slit to provide a plurality of fingers capable of being spread outwardly and having inwardly projecting latching abutments, said inner member having externally projecting camming abutments shaped to engage and pass said latching abutments to spread the fingers on the outer member on the side of said plate remote from the head portion of said outer member, whereby to prevent axial displacement between the outer member and said plate, said abutments engaging after the inner member is inserted to latch the inner member against withdrawal from the outer member.

3. A device as set forth in claim 1 in which said outer hollow member is provided with an internal passage of non-circular cross section and said inner member is provided with a complementarily conformed external cross section, whereby to prevent relative rotative movement between said members after they are assembled.

4. A device as set forth in claim 1 in which said outer hollow member is provided with a shank portion having a substantially square internal and external cross section and slotted at the corners to provide two pairs of opposed flat fingers and the external cross section of the inner member is complementary to the internal cross section of the outer member to provide cooperative engagement therebetween.

5. A device as set forth in claim 1 in which said outer hollow member is provided with a head portion and a shank portion, said shank portion comprising a plurality of longitudinally extending fingers having inwardly projecting abutments thereon, said abutments providing inclined wedging surfaces on one of their sides and latching surfaces on the other of their sides, said inner member having external abutments thereon providing on one of their sides inclined camming surfaces for engagement with said inclined wedging surfaces to spread said fingers, the external abutments on said inner member being further provided with latching surfaces for engagement with the latching surfaces on said outer member to hold the inner member against retraction from the outer member after it has been inserted into latching position in the latter, the lateral dimensions of said wedging surfaces being sufficient to maintain said fingers in spread position.

6. A device as set forth in claim 5 in which the latching surfaces on the inner member are disposed substantially normal to the longitudinal axis of said member and the latching surfaces on the fingers of the outer member are inclined to the longitudinal axis of said outer member at an angle such that said latching surfaces lie substantially normal to the axis of said outer member after said fingers are spread by the insertion of said inner member.

GEORGE H. ERB.
JAMES J. DWYER.
ANDREW G. KOLESSAR.

REFERENCES CITED

The following references are of record in the file of this patent:

UNITED STATES PATENTS

| Number | Name | Date |
| --- | --- | --- |
| Re. 18,229 | Pierce | Oct. 20, 1931 |
| 1,570,148 | Herr | Jan. 19, 1926 |
| 1,686,780 | Wigginton | Oct. 9, 1928 |
| 1,711,453 | Carr | Apr. 30, 1929 |
| 1,944,513 | Johnson | Jan. 23, 1934 |
| 2,150,080 | Rawlings | Mar. 7, 1939 |
| 2,302,590 | Waite | Nov. 17, 1942 |
| 2,402,287 | Kearns | June 18, 1946 |
| 2,424,602 | De Swart | July 29, 1947 |
| 2,424,804 | De Swart | July 29, 1947 |

FOREIGN PATENTS

| Number | Country | Date |
| --- | --- | --- |
| 463,414 | England | Mar. 30, 1937 |

OTHER REFERENCES

Tool and Die Journal, pages 196, 198, 200. July 19, 1944.